(12) United States Patent
Uematsu (10) Patent No.: US 11,515,799 B2
(45) Date of Patent: Nov. 29, 2022

(54) RESONANT CONVERTER CONTROLLER CIRCUIT FOR CONTROLLING RESONANT CONVERTER CONVERTING INPUT DC VOLTAGE INTO DC VOLTAGE

(71) Applicant: OMRON Corporation, Kyoto (JP)

(72) Inventor: Takeshi Uematsu, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/274,643

(22) PCT Filed: Jan. 30, 2020

(86) PCT No.: PCT/JP2020/003418
§ 371 (c)(1),
(2) Date: Mar. 9, 2021

(87) PCT Pub. No.: WO2020/158859
PCT Pub. Date: Aug. 6, 2020

(65) Prior Publication Data
US 2021/0351709 A1    Nov. 11, 2021

(30) Foreign Application Priority Data
Feb. 1, 2019  (JP) .............................. JP2019-017333

(51) Int. Cl.
*H02M 3/335* (2006.01)
*H02M 1/00* (2006.01)
(Continued)

(52) U.S. Cl.
CPC ..... *H02M 3/33571* (2021.05); *H02M 1/0012* (2021.05); *H02M 1/0043* (2021.05);
(Continued)

(58) Field of Classification Search
CPC .... H02M 3/33571; H02M 3/01; H02M 3/285; H02M 1/0012; H02M 1/0043;
(Continued)

(56) References Cited

U.S. PATENT DOCUMENTS

2010/0020575 A1    1/2010  Shimada
2010/0270936 A1    10/2010 Dijkstra et al.
(Continued)

FOREIGN PATENT DOCUMENTS

CN          101951159 A1    1/2011
JP          2010035299 A    2/2010
(Continued)

OTHER PUBLICATIONS

Helen Ding, "Design of Resonant Half-Bridge converter using IRS2795(1,2) Control IC", International Rectifier, Application Note AN-1160, Dated: Oct. 9, 2010; 32 pages.
(Continued)

*Primary Examiner* — Kyle J Moody
*Assistant Examiner* — Jye-June Lee
(74) *Attorney, Agent, or Firm* — Cantor Colburn LLP (57) ABSTRACT

A resonant converter controller circuit is provided. Each period in drive control has a drive time interval and a pause time interval for driving/pausing the resonant converter. The resonant converter controller circuit includes a first oscillating means for generating a clock signal, a second oscillating means for generating a sawtooth wave signal, a third oscillating means for generating a rectangular wave signal, comparison means for outputting a comparison signal indication the rive time interval, by comparing the sawtooth wave signal with a threshold signal, which is generated based on a difference voltage between an output voltage of the resonant converter and a target voltage, and which indicates a ration of the drive time interval to the pause time
(Continued)

interval, and a logical operation means for generating a drive control signal based on the comparison signal and the rectangular wave signal to drive and control the resonant converter.

11 Claims, 6 Drawing Sheets

(51) Int. Cl.
    *H02M 3/00*     (2006.01)
    *H02M 1/08*     (2006.01)
    *H02M 3/28*     (2006.01)

(52) U.S. Cl.
    CPC ............... *H02M 1/08* (2013.01); *H02M 3/01* (2021.05); *H02M 3/285* (2013.01)

(58) Field of Classification Search
    CPC .... H02M 1/08; H02M 1/0025; H02M 1/0035; Y02B 70/10; Y02P 80/10
    See application file for complete search history.

(56) References Cited

U.S. PATENT DOCUMENTS

| | | | |
|---|---|---|---|
| 2011/0176335 A1* | 7/2011 | Li | H02M 3/3376 363/21.02 |
| 2014/0063865 A1 | 3/2014 | Nate | |
| 2014/0312789 A1 | 10/2014 | Feng et al. | |
| 2016/0241145 A1 | 8/2016 | Matsuura et al. | |
| 2018/0241308 A1 | 8/2018 | Matsuura et al. | |
| 2020/0195154 A1* | 6/2020 | Mayell | H02M 3/33569 |

FOREIGN PATENT DOCUMENTS

| | | |
|---|---|---|
| JP | 2013078228 A | 4/2013 |
| JP | 2014027819 A | 2/2014 |
| JP | 2016152642 A | 8/2016 |
| JP | 2018148648 A | 9/2018 |
| WO | 2018198594 A1 | 11/2018 |

OTHER PUBLICATIONS

Katsuya Hirachi, "Circuit Configuration and Operating Principles of LLC DC/DC Converter", Maizuru College of Technology, Dated: May 29, 2014; 8 pages.
International Search Report for International Application No. PCT/JP2020/003418; dated Apr. 7, 2020.
PCT Written Opinion of the International Searching Authority for International Application No. PCT/JP2020/003418; dated Apr. 7, 2020.
Chen et al., "A Burst Mode Pulse Density Modulation Scheme for Inductive Power Transfer Systems Without Communication Modules", 2018 IEEE Applied Power Electronics Conference and Exposition (APEC), IEEE, Mar. 4, 2018, pp. 1071-1075; XP033347426.
EPO Extended European Search Report for corresponding EP Application No. 20749384.2, dated Mar. 25, 2022.

* cited by examiner

RESONANT CONVERTER CONTROLLER CIRCUIT FOR CONTROLLING RESONANT CONVERTER CONVERTING INPUT DC VOLTAGE INTO DC VOLTAGE

CROSS REFERENCE TO RELATED APPLICATIONS

This is the U.S. national stage of application No. PCT/JP2020/003418, filed on Jan. 30, 2020. Priority under 35 U.S.C. § 119(a) and 35 U.S.C. § 365(b) is claimed from Japanese Application No. 2019-017333, filed Feb. 1, 2019, the disclosure of which is also incorporated herein by reference.

TECHNICAL FIELD

The present invention relates to a control circuit for a resonant converter, a control method therefor, and a resonant converter.

BACKGROUND ART

Currently, hysteresis control is generally known as a method for controlling the output voltage of a resonant DCDC converter (see, for example, Non-Patent Documents 1 and 2). In the hysteresis control, an output voltage Vo is detected, and a switching circuit is controlled so that the detected output voltage Vo falls within a predetermined allowable range including a target voltage Vd. As a result, the resonant converter can be controlled while suppressing the error between the output voltage Vo and the target voltage Vd to a predetermined value or less.

PRIOR ART DOCUMENTS

Patent Document

Patent Document 1: JP 2013-78228 A

Non-Patent Documents

Non-Patent Document 1: Helen Ding, "Application Note AN-1160", [online], Oct. 9, 2010, Infineon Technologies, [Search: Oct. 30, 2018], Internet <URL: https://www.infineon.com/dgdl/an-1160.pdf?fileId=5546d462533600a40153559a85df1115>
Non-Patent Document 2: Katsuya Hirachi, "Circuit Configuration and Operating Principles of LLC DC/DC Converter", [online], May 29, 2014, Maizuru College of Technology, [Search: Oct. 30, 2018], Internet <URL: http://hirachi.cocolog-nifty.com/kh/files/20140529-3.pdf>

SUMMARY OF THE INVENTION

Problems to be Solved by the Invention

In the control of the resonant converters according to Non-Patent Documents 1 and 2, the accuracy of control is limited because there is a predetermined allowable range of output voltages. Furthermore, since the duty and period of a drive signal for controlling the resonant converter can change depending on factors such as the magnitude of an input voltage or the magnitude of a load, behaviors such as the operation of the resonant converter and the transition of an output voltage are difficult to predict. This also makes control difficult.

An object of the present invention is to solve the above problems, and to provide a resonant converter controller circuit that can control the output voltage of a resonant converter more precisely and easily than the prior art, a control method for the control circuit, and a resonant converter.

Means for Solving the Problems

According to the first invention, there is provided a resonant converter controller circuit for controlling a resonant converter that converts an input DC voltage into an AC voltage, resonates the converted AC voltage via a resonant circuit, then converts the AC voltage into a DC voltage, and outputs the DC voltage such that the output DC voltage becomes a predetermined target voltage. Each period in drive control of the resonant converter has a drive time interval for driving the resonant converter and a pause time interval for pausing the resonant converter. The resonant converter controller circuit includes a first oscillating means, a second oscillating means, a third oscillating means, a comparison means, and a logical operation means. The first oscillating means generates a clock signal having a predetermined fundamental frequency. The second oscillating means generates a sawtooth wave signal synchronized with the clock signal. The third oscillating means generates a rectangular wave signal having a predetermined duty and a predetermined frequency higher than a frequency of the sawtooth wave signal. The comparison means outputs a comparison signal indicating the drive time interval, by comparing the sawtooth wave signal with a threshold signal. The threshold signal is generated based on a difference voltage between an output voltage of the resonant converter and a target voltage that is a target value of the output voltage. The threshold signal indicates a ratio of the drive time interval to the pause time interval. The logical operation means calculates a logical product between the comparison signal and the rectangular wave signal, generates a drive control signal indicating a calculation result, and drives and controls the resonant converter.

In the resonant converter controller circuit, the difference voltage is a voltage that has passed through a compensator that compensates and stabilizes a target voltage waveform.

Also, in the resonant converter controller circuit, the rectangular wave signal has a duty of 50%.

Further, in the resonant converter controller circuit, the third oscillating means multiplies the clock signal to generate the rectangular wave signal.

According to the second invention, there is provided a control method for a resonant converter controller circuit for controlling a resonant converter that converts an input DC voltage into an AC voltage, resonates the converted AC voltage via a resonant circuit, then converts the AC voltage into a DC voltage, and outputs the DC voltage such that the output DC voltage becomes a predetermined target voltage. Each period in drive control of the resonant converter has a drive time interval for driving the resonant converter and a pause time interval for pausing the resonant converter. The control method comprises the steps of generating a clock signal, generating a sawtooth wave signal, generating a rectangular wave signal, outputting a comparison signal, and calculating a logical product between the comparison signal and the rectangular wave signal, generating a drive control signal indicating a calculation result, and driving and controlling the resonant converter. The clock signal has a predetermined fundamental frequency. The sawtooth wave signal is synchronized with the clock signal. The rectangular wave signal has a predetermined duty and a predetermined frequency higher than that of the sawtooth wave signal. The comparison signal indicates the drive time interval and is output by comparing the sawtooth wave signal with a threshold signal. The threshold signal is generated based on a difference voltage between an output voltage of the resonant converter and a target voltage that is a target value of the output voltage. The threshold signal indicates a ratio of the drive time interval to the pause time interval.

In the control method for a resonant converter controller circuit, the control method further comprises a step of generating a difference voltage which has passed through a compensator that compensates and stabilizes a target voltage waveform Also, in the control method for a resonant converter controller circuit, the rectangular wave signal has a duty of 50%.

Further, in the control method for a resonant converter controller circuit, the step of generating the rectangular wave signal includes multiplying the clock signal to generate a rectangular wave signal.

According to the third invention, there is provided a resonant converter including the above resonant converter controller circuit. The resonant converter includes a main circuit that converts an input DC voltage into an AC voltage, resonates the converted AC voltage via a resonant circuit, then converts the AC voltage into a DC voltage, and outputs the DC voltage.

In the resonant converter, the resonant converter further includes a number N of the main circuits connected in parallel and the N resonant converter controller circuits configured to respectively control the N main circuits. The N resonant converter controller circuits generates sawtooth wave signals having a phase difference of 360/N° from each other.

Also, in the resonant converter, the N resonant converter controller circuits include the one first oscillating means and the one second oscillating means, and at least some of the N resonant converter controller circuits share the first and second oscillating means.

Effects of the Invention

According to the present invention, the output voltage of the resonant converter can be controlled more precisely and easily than the prior art.

MODES FOR CARRYING OUT THE INVENTION

Embodiments according to the present invention will be described below with reference to the accompanying drawings. However, each of the embodiments described below is merely an example of the present invention in all respects. Needless to say, various improvements and modifications can be made without departing from the scope of the present invention. That is, in carrying out the present invention, a specific configuration according to the embodiments may be appropriately adopted.

First Embodiment

Figure 1:
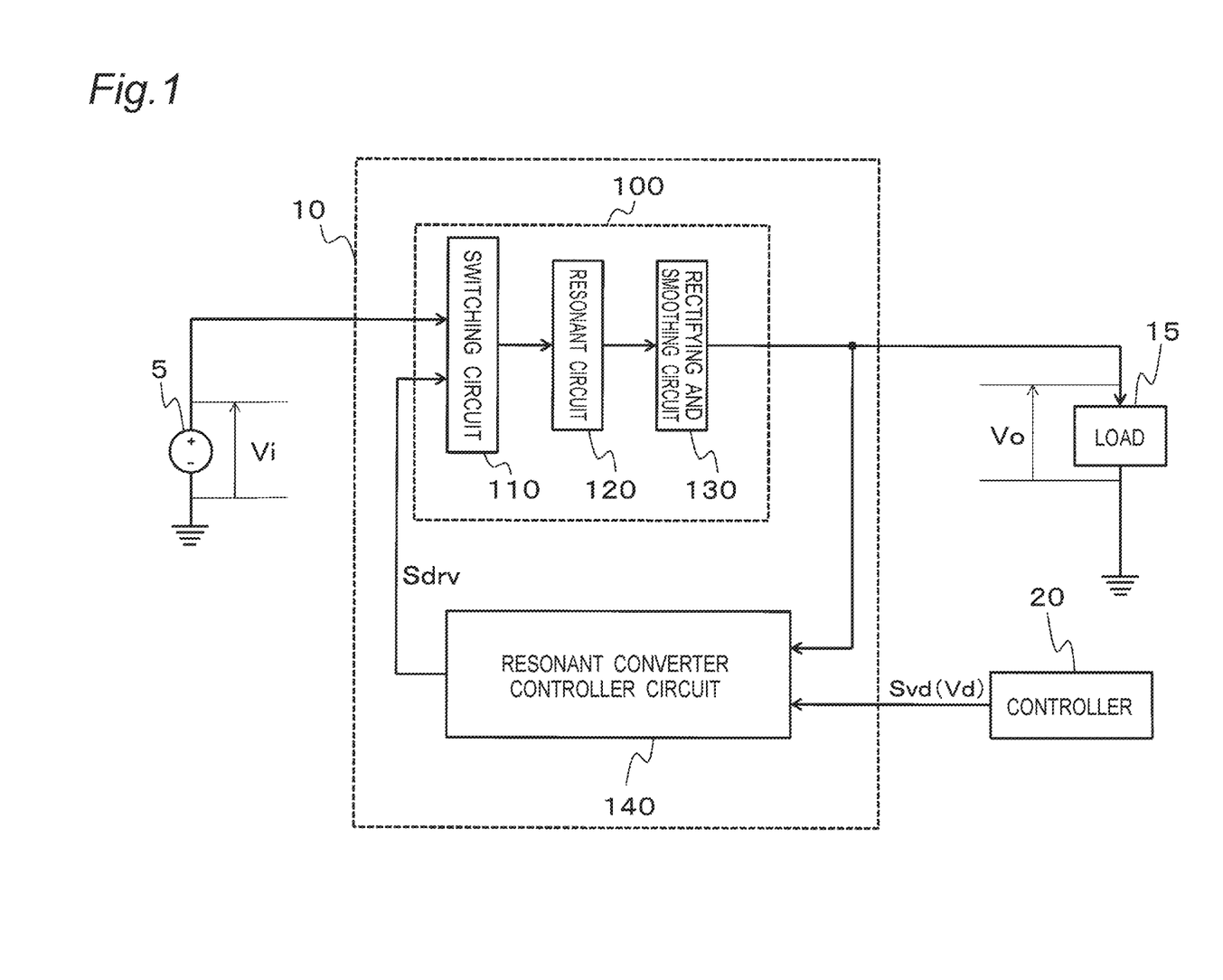
FIG. 1 is a block diagram showing a configuration example of a resonant converter 10 according to a first embodiment.

FIG. 1 is a block diagram showing a configuration example of a resonant converter 10 according to the first embodiment. Referring to FIG. 1, the resonant converter 10 is a resonant DCDC converter that converts an input DC voltage into an AC voltage, resonates the AC voltage via a resonant circuit 120, converts the resonated voltage into a DC voltage, and outputs the DC voltage. The resonant converter 10 includes a main circuit 100 and a resonant converter controller circuit 140. The main circuit 100 includes a switching circuit 110, the resonant circuit 120, and a rectifying and smoothing circuit 130. Further, a DC voltage source 5, a load 15, and a controller 20 are connected to the resonant converter 10.

Referring to FIG. 1, the external DC voltage source 5 generates a DC voltage Vi and outputs it to the switching circuit 110 of the resonant converter 10. Further, the controller 20 outputs a signal Svd indicating a target voltage Vd, which is a target value of the output voltage of the resonant converter 10, to the resonant converter 10. The resonant converter 10 converts the input DC voltage Vi into a DC output voltage Vo based on the signal Svd indicating the target voltage and supplies it to the external load 15.

The resonant converter controller circuit 140 generates a drive signal Sdrv for controlling the main circuit 100 based on the signal Svd indicating the output voltage Vo and the target voltage Vd of the main circuit 100, and outputs the drive signal Sdrv to the main circuit 100, thereby feedback-controlling the main circuit 100. As a result, the main circuit 100 converts the input voltage Vi into the output voltage Vo based on the drive signal Sdrv from the resonant converter controller circuit 140 and supplies it to the load 15. The drive signal Sdrv is an example of the "drive control signal" of the present invention.

The switching circuit 110 switches the DC input voltage Vi according to the drive signal Sdrv from the resonant converter controller circuit 140, and outputs the AC voltage generated by the switching to the rectifying and smoothing circuit 130 via the resonant circuit 120. The rectifying and smoothing circuit 130 rectifies and smooths the input AC voltage, generates the DC output voltage Vo, and outputs the DC output voltage Vo to the load 15.

Figure 2:
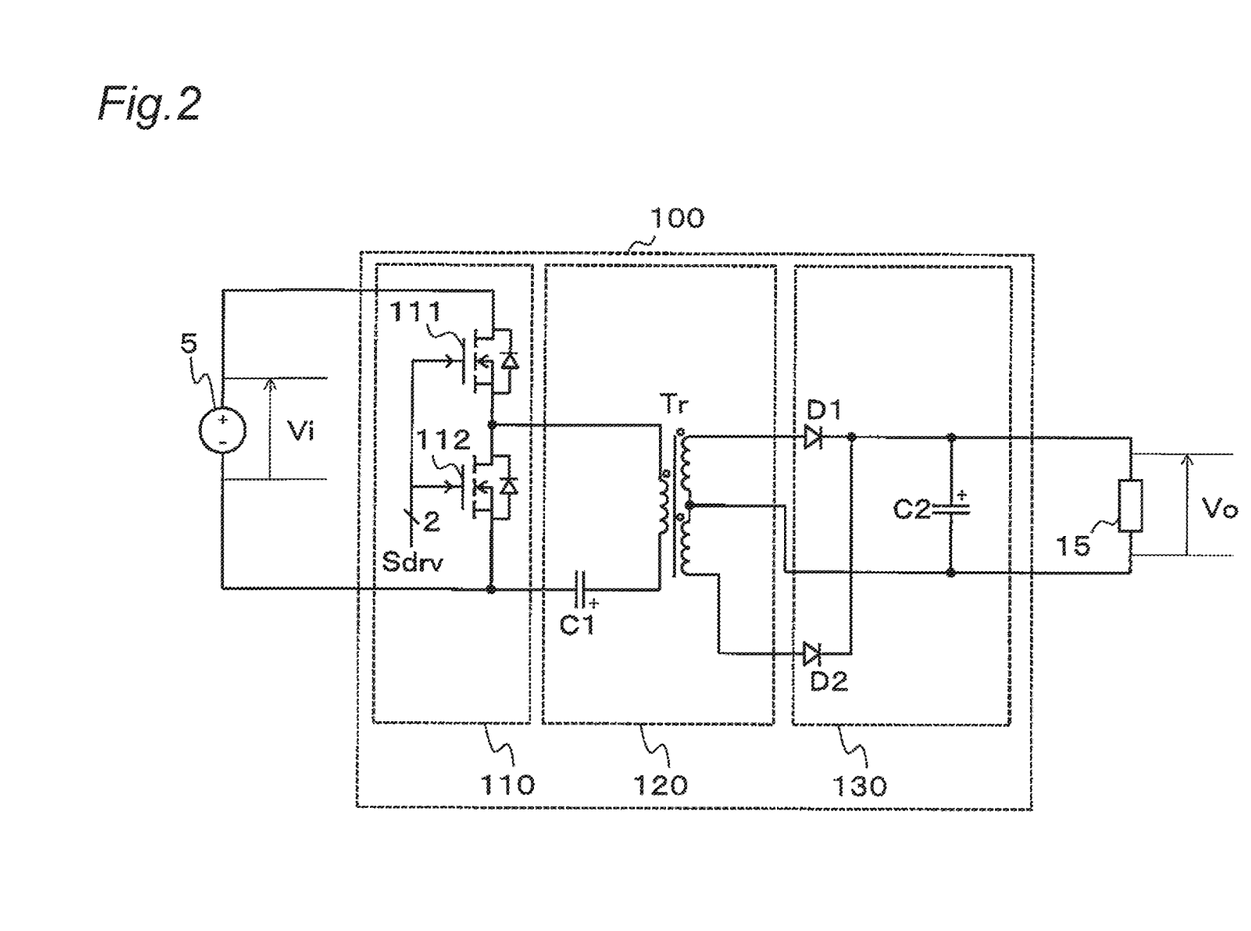
FIG. 2 is a circuit diagram showing a configuration example of a main circuit 100 in FIG. 1.

FIG. 2 is a circuit block diagram showing a configuration example of the main circuit 100 in FIG. 1. Referring to FIG. 2, the main circuit 100 is an asymmetric half-bridge type LLC converter. The main circuit 100 includes MOSFETs 111 and 112, a transformer Tr, resonant capacitor C1, diodes D1 and D2, and a smoothing capacitor C2.

Referring to FIG. 2, MOSFETs 111 and 112 are n-channel MOSFETs. MOSFETs 111 and 112 are each driven by the drive signal Sdrv to switch conduction on and off. The MOSFET 112 is controlled off while the MOSFET 111 is on, and conversely the MOSFET 112 is controlled on while the MOSFET 111 is off. This makes the switching circuit 110 switch the input voltage Vi according to the drive signal Sdrv, and output the AC voltage generated by the switching to the rectifying and smoothing circuit 130 via the resonant circuit 120. The diodes D1 and D2 of the rectifying and smoothing circuit 130 and the smoothing capacitor C2 supply the output voltage Vo to the load 15 after full-wave rectifying and smoothing the AC voltage from the resonant circuit 120.

Figure 3:
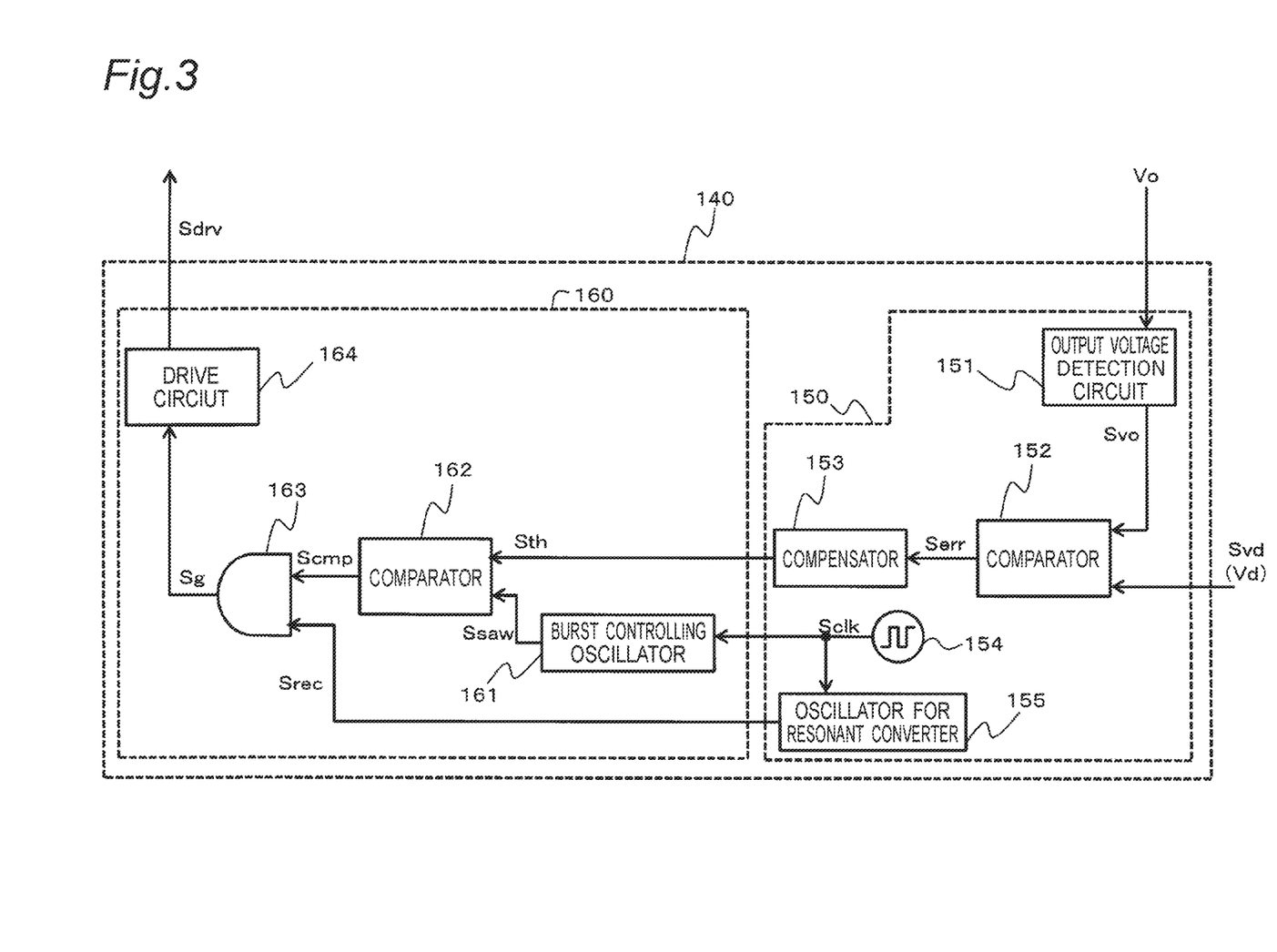
FIG. 3 is a block diagram showing a configuration example of a resonant converter controller circuit 140 in FIG. 1.

FIG. 3 is a block diagram showing a configuration example of the resonant converter controller circuit 140 in FIG. 1. Referring to FIG. 3, the resonant converter controller circuit 140 includes a control signal generation unit 150 and a drive signal generation unit 160. The control signal generation unit 150 includes an output voltage detection circuit 151, a comparator 152, a compensator 153, a clock oscillator 154, and an oscillator for resonant converter 155. Further, the drive signal generation unit 160 includes a burst controlling oscillator 161, a comparator 162, an AND gate 163, and a drive circuit 164.

Referring to FIG. 3, the output voltage detection circuit 151 generates an output voltage signal Svo corresponding to the output voltage Vo of the main circuit 100 and outputs it to the comparator 152. The comparator 152 compares the output voltage signal Svo with the target voltage signal Svd from the controller 20, generates a threshold signal Sth indicating a control amount for achieving the target voltage Vd, based on the difference between the output voltage Vo and the target voltage Vd, and outputs the threshold signal Sth to the comparator 162 via the compensator 153 that is, for example, a low-pass filter for compensating and stabilizing the target voltage waveform.

The clock oscillator 154 generates a clock signal Sclk, which is a pulse signal having a predetermined fundamental frequency, and outputs the clock signal Sclk to the oscillator for resonant converter 155 and the burst controlling oscillator 161. The burst controlling oscillator 161 synchronizes with the clock signal Sclk, generates a sawtooth wave signal Ssaw having a predetermined period Tsaw, a predetermined maximum value Asaw, and a minimum value of 0, and outputs the sawtooth wave signal Ssaw to the comparator 162. The maximum value Asaw of the sawtooth wave signal Ssaw will be described later.

The comparator 162 compares the sawtooth wave signal Ssaw with a threshold signal Sth, generates a comparison signal Scmp having a high level during the time interval when the value of the sawtooth wave signal Ssaw is equal to or less than the value of the threshold signal Sth and having a low level during the time interval when the value of the sawtooth wave signal Ssaw is larger than the value of the threshold signal Sth, and outputs the comparison signal Scmp to the AND gate 163. In the present specification, the time interval in which the comparison signal Scmp has a high level is referred to as a drive time interval Pbst, and the time interval in which the comparison signal Scmp has a low level is referred to as a pause time interval Pslp.

The maximum value Asaw of the sawtooth wave signal Ssaw output from the burst controlling oscillator 161 is set to be equal to the value of the threshold signal Sth output from the compensator 153 when the voltage indicated by the target voltage signal Svd is equal to the output voltage Vo when the resonant converter 10 is controlled to have the maximum output. As a result, the duty of the comparison signal Scmp becomes equal to the ratio of the value of the threshold signal Sth to the maximum value Asaw of the sawtooth wave signal Ssaw.

The oscillator for resonant converter 155 multiplies the clock signal Sclk, generates a rectangular wave signal Srec, which is a pulse signal with a duty of 50%, and outputs it to the AND gate 163. The frequency of the rectangular wave signal Srec is set to be an integral multiple (for example, 5 times, 8 times, or 10 times) of the frequency of the sawtooth wave signal Ssaw. That is, the period Trec of the rectangular wave signal Srec is set to be an integral fraction of the period Tsaw of the sawtooth wave signal Ssaw (for example, ⅕, ⅛, or 1/10). For example, the frequency of the sawtooth wave signal Ssaw may be set to 10 kHz and the frequency of the rectangular wave signal Srec may be set to 80 kHz. The oscillator for resonant converter 155 is an example of the "first oscillating means" of the present invention.

The AND gate 163 generates a gate signal Sg by taking the logical product of the comparison signal Scmp and the rectangular wave signal Srec, and outputs the gate signal Sg to the drive circuit 164. The drive circuit 164 generates a drive signal Sdrv based on the gate signal Sg to drive and control the switching circuit 110.

The operation of the resonant converter 10 configured as described above will be described below.

Figure 4:
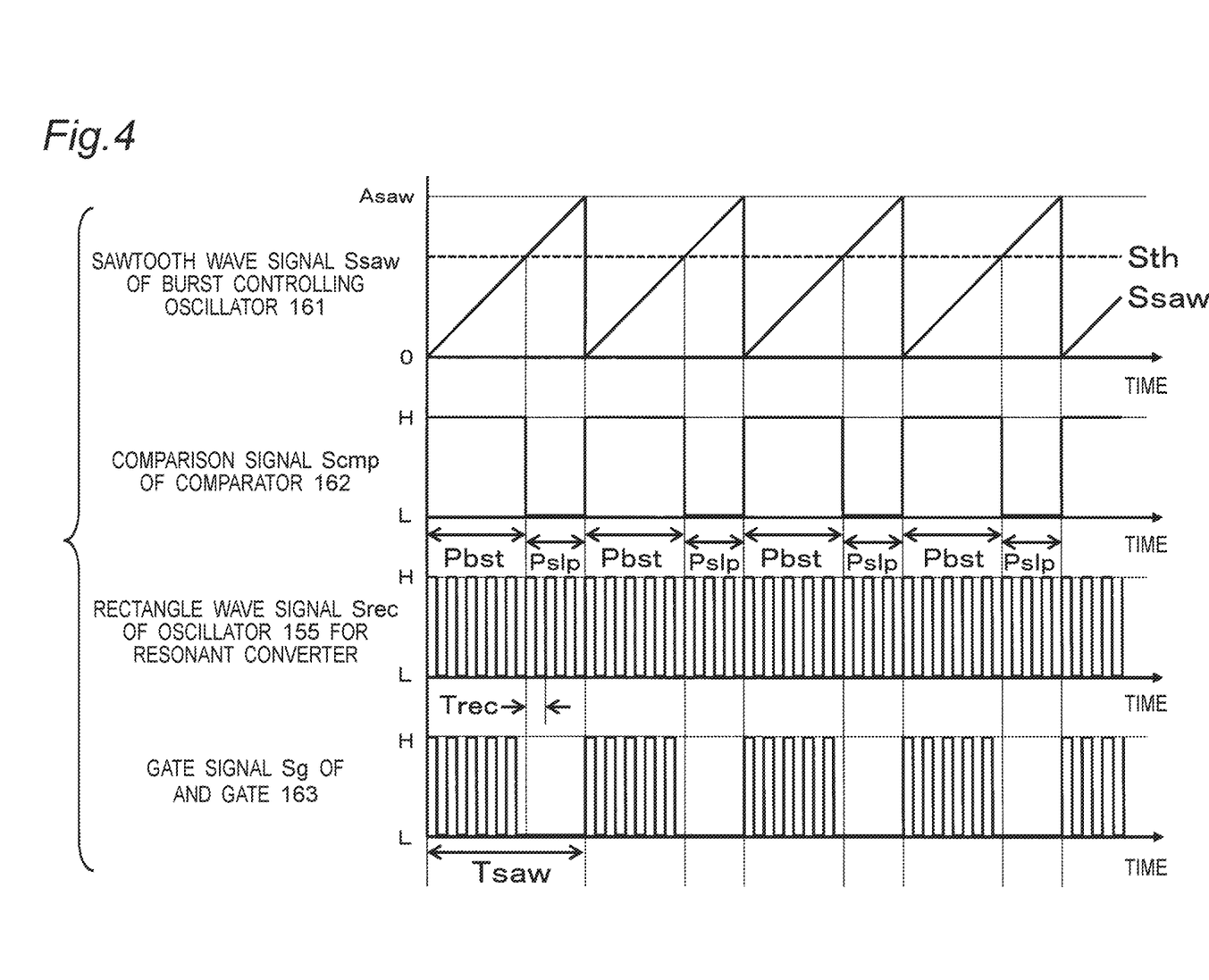
FIG. 4 is a timing chart showing an example of operation waveforms such as signals in each part of the resonant converter controller circuit 140 in FIG. 1.

FIG. 4 is a timing chart showing an example of operating waveforms such as signals in each part of the resonant converter controller circuit 140 of FIG. 1. The comparator 162 compares the sawtooth wave signal Ssaw from the burst controlling oscillator 161 with the threshold signal Sth from the compensator 153, and generates the comparison signal Scmp shown in FIG. 4. The time interval during which the comparison signal Scmp has a high level is the drive time interval Pbst, and the time interval during which the comparison signal Scmp has a low level is the pause time interval Pslp.

Further, as shown in FIG. 4, the oscillator for resonant converter 155 generates the rectangular wave signal Srec, which is a pulse signal having the predetermined period Trec and a duty of 50%, and outputs the rectangular wave signal Srec to the AND gate 163. The oscillator for resonant converter 155 is an example of the "third oscillating means" of the present invention.

Referring to FIG. 4, the gate signal Sg of the AND gate 163 is a signal obtained by calculating the logical product of the comparison signal Scmp and the rectangular wave signal Srec. Therefore, the gate signal Sg of the AND gate 163 has the rectangular wave signal Srec in the drive time interval Pbst and always has a low level in the pause time interval Pslp. The drive circuit 164 drives and controls the switching circuit 110 of the main circuit 100 by generating a drive signal Sdrv based on the gate signal Sg and outputting it to the main circuit 100. As a result, the resonant converter is controlled by the rectangular wave signal Srec during the drive time interval Pbst, and pauses without being driven during the pause time interval Pslp.

The duty of the comparison signal Scmp indicates the ratio of the drive time interval Pbst to the period Tsaw of the sawtooth wave signal Ssaw. Further, the value of the threshold signal Sth changes depending on the difference between the output voltage Vo and the target voltage Vd, and the duty of the comparison signal Scmp also changes accordingly. As a result, the drive circuit 164 can generate the drive signal Sdrv for controlling to correct the difference between the current output voltage Vo and the target voltage Vd.

For example, when the output voltage Vo is larger than the target voltage Vd, the value of the threshold signal Sth becomes smaller than the value immediately before, and the duty of the comparison signal Scmp decreases. Therefore, the drive time interval Pbst in the gate signal Sg becomes shorter than the immediately preceding period, and the number of pulse waves contained in the drive signal Sdrv decreases. Therefore, the output voltage Vo of the main circuit 100 is controlled so as to decrease and approach the target voltage Vd.

As described above, in the present embodiment, each period in the drive control of the resonant converter 10 has the drive time interval Pbst of driving the resonant converter 10 and the pause time interval Pslp of pausing the resonant converter 10. During the drive time interval Pbst, the resonant converter 10 is controlled by the rectangular wave signal Srec, which is a periodic pulse signal having a predetermined duty. The value of the threshold signal Sth indicating the ratio of the drive time interval Pbst to the pause time interval Pslp changes based on the difference voltage between the output voltage Vo and the target voltage Vd. As a result, the output voltage Vo of the resonant converter 10 is controlled to be the target voltage Vd.

By controlling in this way, an error from the target voltage Vd at the output voltage Vo is always reflected in feedback control, so the output voltage Vo of the resonant converter 10 can be controlled to become the target voltage Vd with high accuracy compared with the prior art. Further, the period in the drive control of the resonant converter 10 is always constant regardless of factors such as the magnitude of the input voltage Vi or the magnitude of the load 15. Therefore, the ripple of the output voltage Vo of the main circuit 100 is periodic and can be easily predicted. As described above, according to the present embodiment, the output voltage Vo of the resonant converter 10 can be controlled more precisely and easily as compared with the prior art so as to be the target voltage Vd.

Second Embodiment

Figure 5:
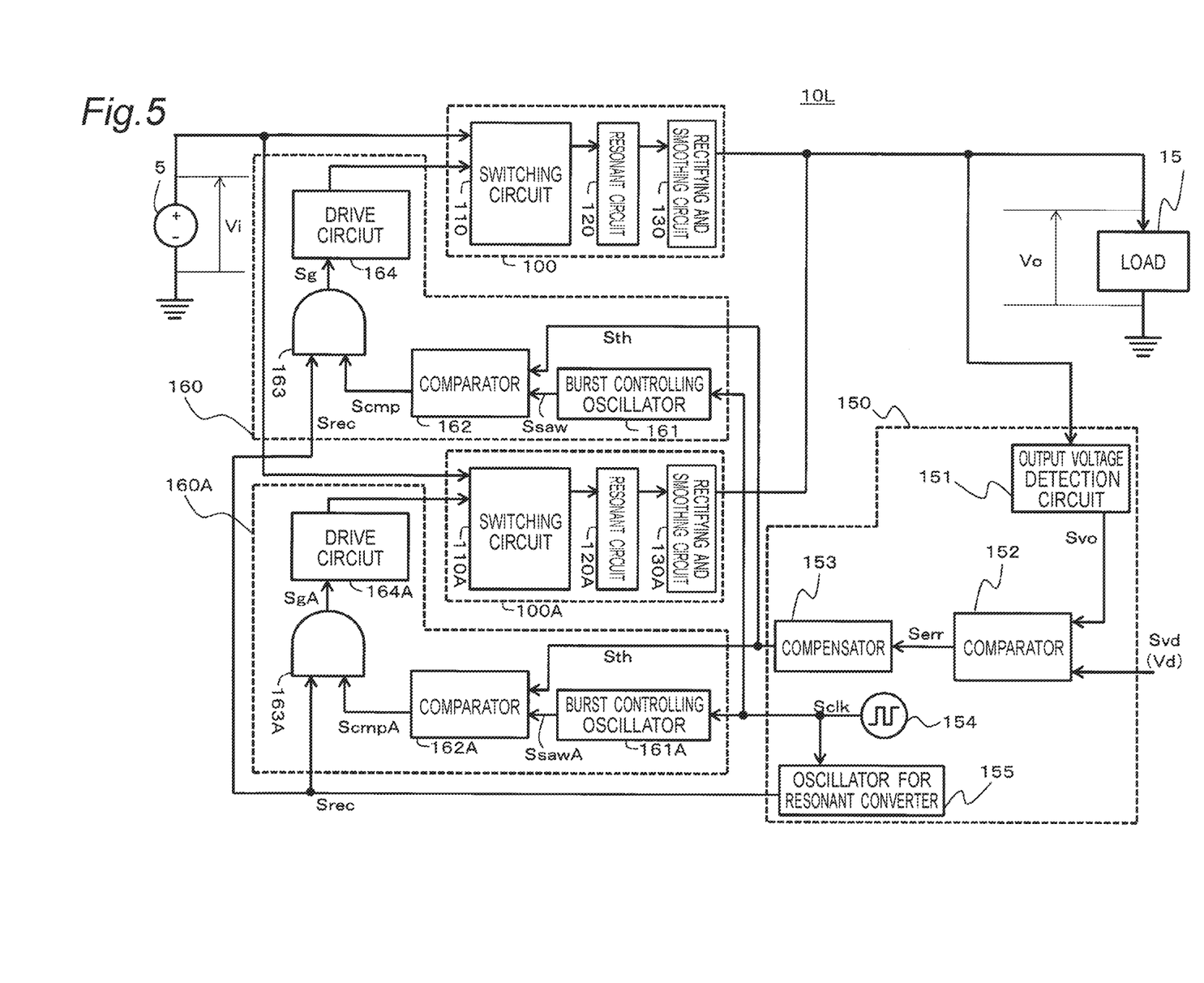
FIG. 5 is a block diagram showing a configuration example of a resonant converter 10L according to a second embodiment.

FIG. 5 is a block diagram showing a configuration example of a resonant converter 10L according to the second embodiment. Referring to FIG. 5, the resonant converter 10L differs from the resonant converter 10 in FIG. 1 in the following points.

(1) The resonant converter 10L further includes a main circuit 100A.

(2) The resonant converter 10L further includes a resonant converter controller circuit 140A (not shown) that drives and controls the main circuit 100A.

(3) The burst controlling oscillator 161A of the resonant converter controller circuit 140A operates with a phase shifted by 180° as compared with the burst controlling oscillator 161 of the resonant converter controller circuit 140.

Referring to FIG. 5, the main circuit 100A has the same configuration and operation as those of the main circuit 100. The resonant converter controller circuit 140A is configured in the same manner as the resonant converter controller circuit 140, and includes a control signal generation unit 150 and a drive signal generation unit 160A. The control signal generation unit 150 is shared with the resonant converter controller circuit 140.

Figure 6:
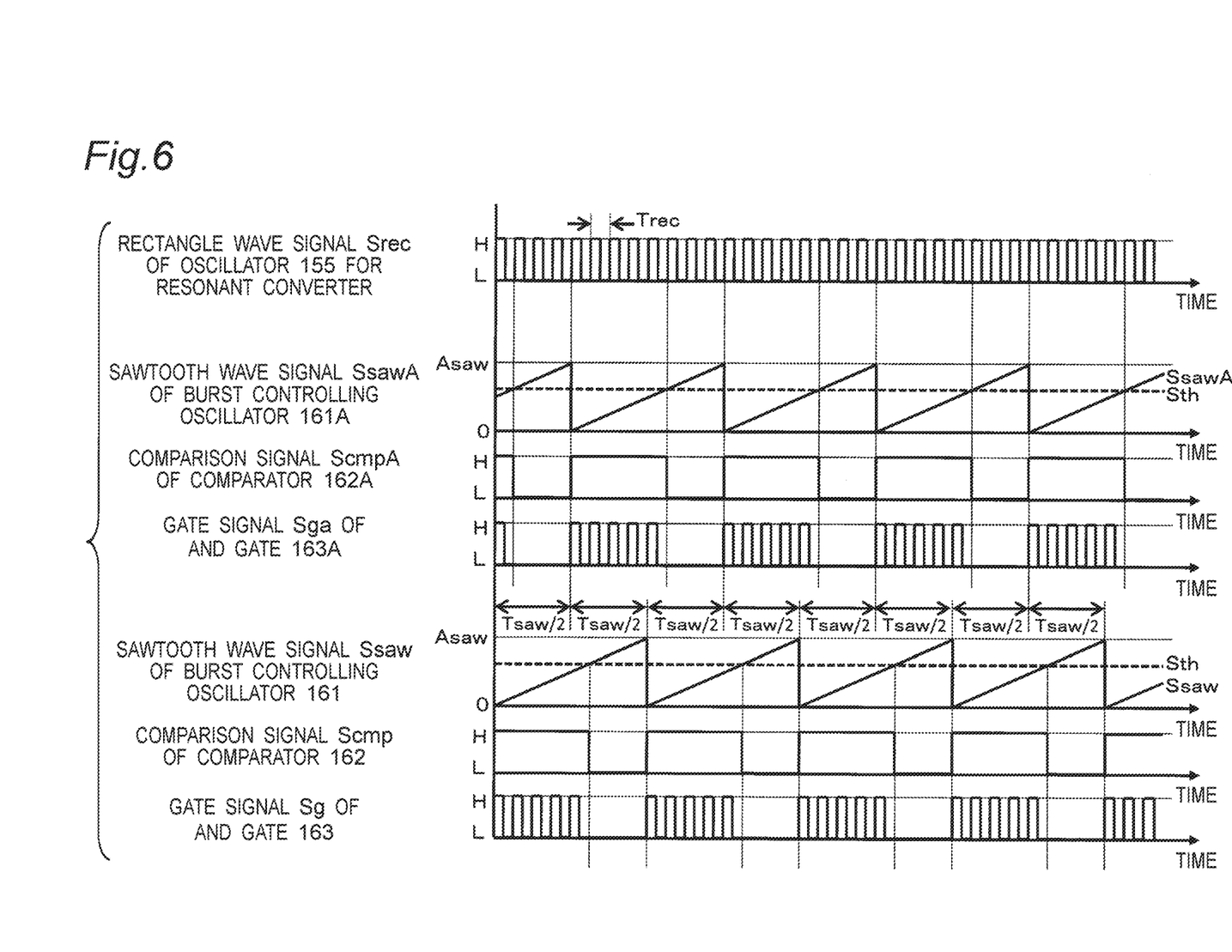
FIG. 6 is a timing chart showing an example of operation waveforms such as signals in each part of the resonant converter 10L in FIG. 5.

FIG. 6 is a timing chart showing an example of operating waveforms such as signals in the resonant converter 10L of FIG. 5.

Referring to FIG. 6, the burst controlling oscillator 161A operates with a phase shifted by 180° as compared with the burst controlling oscillator 161. Therefore, sawtooth wave signals Ssaw and SsawA operate with a shift of Tsaw/2. This also causes a shift of Tsaw/2 between gate signals Sg and SgA. Therefore, the timing of the drive time interval in the main circuit 100A is shifted by Tsaw/2 with respect to a drive time interval Pbst (not shown) in the main circuit 100. This generates a phase difference of 180° between the ripples of the output voltages of the two main circuits 100 and 100A. Since these ripples cancel each other out in a combined output voltage Vo, the error caused by the ripples is reduced, and it is possible to perform more accurate control than in the first embodiment.

In the second embodiment, the resonant converter controller circuits 140 and 140A share the control signal generation unit 150, but the present invention is not limited to this, and these may not be shared. For example, the resonant converter controller circuit 140A may newly include a control signal generation unit 150A that operates in the same manner as the control signal generation unit 150.

In addition, the resonant converter 10L has two main circuits. However, the present invention is not limited to this, and the number of main circuits included in the resonant converter 10L may be three or more. For example, the resonant converter 10L may include two or more N main circuits connected in parallel and N resonant converter controller circuits that control each of the N main circuits. In that case, the N resonant converter controller circuits may each have a phase difference of 360/N° from each other. Further, at least some of the N resonant converter controller circuits may share at least some of the components with each other.

Modified Embodiments

Although the embodiments of the present invention have been described in detail above, the above description is merely an example of the present invention in all respects. Needless to say, various improvements and modifications can be made without departing from the scope of the present invention. For example, the following changes can be made. In the following, the same reference numerals will be used for the same components as those in the above embodiments, and the same points as in the above embodiments will be omitted as appropriate. The following modifications can be combined as appropriate.

For example, in the first embodiment, the rectangular wave signal Srec and the sawtooth wave signal Ssaw are synchronized with the clock signal Sclk. However, the present invention is not limited to this, and as long as the frequency of the rectangular wave signal Srec is an integral multiple of the frequency of the sawtooth wave signal Ssaw, the rectangular wave signal Srec and the sawtooth wave signal Ssaw need not be synchronized with the clock signal Sclk . . . .

Similarly, in the second embodiment, the rectangular wave signal Srec need not be synchronized with the sawtooth wave signals Ssaw and SsawA. In this case, the rectangular wave signal Srec is generated without being synchronized with the clock signal Sclk. In order to obtain the effect of making the ripples cancel each other, the sawtooth wave signal Ssaw and the sawtooth wave signal SsawA are synchronized with each other to keep a phase shift between the burst controlling oscillators 161,161A.

Further, in the first embodiment, the comparison signal Scmp is generated by using the comparator 162 that compares the sawtooth wave signal Ssaw with the threshold signal Sth. Similarly, in the second embodiment, the comparison signals Scmp and ScmpA are generated by using the comparators 162 and 162A that compare the sawtooth wave signals Ssaw and SsawA with the threshold signal Sth. These comparison signals Scmp and ScmpA are only examples of "signals indicating the drive time interval". Further, these comparators 162 and 162A are only an example of "comparison means" for generating a signal indicating a drive time interval. Therefore, the present invention is not limited to this, and any signal indicating the drive time interval may be used as long as the drive time interval Pbst and the pause time interval Pslp can be distinguished.

Further, in the first and second embodiments, LLC converters are used as the main circuits 100 and 100A. However, the present invention is not limited to this, and a main circuit such as an E2 class converter, a Φ2 class converter, a series resonant converter, or a parallel resonant converter can be used as the main circuit controlled by the resonant converter controller circuit.

As described above, those skilled in the art can make various changes within the scope of the present invention according to the embodiment.

The invention claimed is:

1. A resonant converter controller circuit for controlling a resonant converter that converts an input DC voltage into an AC voltage, resonates the converted AC voltage via a resonant circuit, then converts the AC voltage into a DC voltage, and outputs the DC voltage such that the output DC voltage becomes a predetermined target voltage,
wherein each period in drive control of the resonant converter has a drive time interval for driving the resonant converter and a pause time interval for pausing the resonant converter, and
the resonant converter controller circuit comprises:
first oscillating means for generating a clock signal having a predetermined fundamental frequency;
second oscillating means for generating a sawtooth wave signal synchronized with the clock signal;
third oscillating means for generating a rectangular wave signal having a predetermined duty and a predetermined frequency higher than a frequency of the sawtooth wave signal;
comparison means for outputting a comparison signal indicating the drive time interval, by comparing the sawtooth wave signal with a threshold signal, which is generated based on a difference voltage between an output voltage of the resonant converter and a target voltage that is a target value of the output voltage, and which indicates a ratio of the drive time interval to the pause time interval; and
logical operation means for calculating a logical product between the comparison signal and the rectangular wave signal, generating a drive control signal indicating a calculation result, and driving and controlling the resonant converter.

2. The resonant converter controller circuit according to claim 1, wherein the difference voltage is a voltage that passes through a compensator that compensates and stabilizes a target voltage waveform.

3. The resonant converter controller circuit according to claim 1, wherein the rectangular wave signal has a duty of 50%.

4. The resonant converter controller circuit according to claim 1, wherein the third oscillating means multiplies the clock signal to generate the rectangular wave signal.

5. A control method for a resonant converter controller circuit for controlling a resonant converter that converts an input DC voltage into an AC voltage, resonates the converted AC voltage via a resonant circuit, then converts the AC voltage into a DC voltage, and outputs the DC voltage such that the output DC voltage becomes a predetermined target voltage,
wherein each period in drive control of the resonant converter has a drive time interval for driving the resonant converter and a pause time interval for pausing the resonant converter, and
the control method comprises the steps of:
generating a clock signal having a predetermined fundamental frequency;
generating a sawtooth wave signal synchronized with the clock signal;
generating a rectangular wave signal having a predetermined duty and a predetermined frequency higher than a frequency of the sawtooth wave signal;
outputting a comparison signal indicating the drive time interval, by comparing the sawtooth wave signal with a threshold signal which is generated based on a difference voltage between an output voltage of the resonant converter and a target voltage that is a target value of the output voltage and which indicates a ratio between the drive time interval and the pause time interval, and
calculating a logical product between the comparison signal and the rectangular wave signal, generating a drive control signal indicating a calculation result, and driving and controlling the resonant converter.

6. The control method for a resonant converter controller circuit according to claim 5, further comprising a step of generating a difference voltage which passes through a compensator that compensates and stabilizes a target voltage waveform.

7. The control method for a resonant converter controller circuit according to claim 5, wherein the rectangular wave signal has a duty of 50%.

8. The control method for the resonant converter controller circuit according to claim 5, wherein the step of generating the rectangular wave signal includes multiplying the clock signal to generate the rectangular wave signal.

9. A resonant converter including a resonant converter controller circuit, the resonant converter comprising a main circuit that converts an input DC voltage into an AC voltage, resonates the converted AC voltage via a resonant circuit, then converts the AC voltage into a DC voltage, and outputs the DC voltage such that the output DC voltage becomes a predetermined target voltage,
wherein each period in drive control of the resonant converter has a drive time interval for driving the resonant converter and a pause time interval for pausing the resonant converter, and
the resonant converter controller circuit comprises:
first oscillating means for generating a clock signal having a predetermined fundamental frequency;
second oscillating means for generating a sawtooth wave signal synchronized with the clock signal;
third oscillating means for generating a rectangular wave signal having a predetermined duty and a predetermined frequency higher than a frequency of the sawtooth wave signal;
comparison means for outputting a comparison signal indicating the drive time interval, by comparing the sawtooth wave signal with a threshold signal which is generated based on a difference voltage between an output voltage of the resonant converter and a target voltage that is a target value of the output voltage and which indicates a ratio of the drive time interval to the pause time interval; and logical operation means for calculating a logical product between the comparison signal and the rectangular wave signal, generating a drive control signal indicating a calculation result, and driving and controlling the resonant converter.

10. The resonant converter according to claim 9, further comprising:

a number N of the main circuits connected in parallel; and

N resonant converter controller circuits configured to respectively control the N main circuits, wherein the N resonant converter controller circuits generate sawtooth wave signals having a phase difference of 360/N° from each other.

11. The resonant converter according to claim 10, wherein the N resonant converter controller circuits include the first oscillating means and the second oscillating means, and at least some of the N resonant converter controller circuits share the first and second oscillating means.

* * * * *